US009411875B2

(12) United States Patent
Cui et al.

(10) Patent No.: US 9,411,875 B2
(45) Date of Patent: Aug. 9, 2016

(54) TAG REFINEMENT STRATEGIES FOR SOCIAL TAGGING SYSTEMS

(75) Inventors: Bin Cui, Beijing (CN); Junjie Yao, Beijing (CN)

(73) Assignee: PEKING UNIVERSITY (CN)

( * ) Notice: Subject to any disclaimer, the term of this patent is extended or adjusted under 35 U.S.C. 154(b) by 194 days.

(21) Appl. No.: 13/980,573

(22) PCT Filed: Mar. 31, 2012

(86) PCT No.: PCT/CN2012/073403
§ 371 (c)(1),
(2), (4) Date: Jul. 18, 2013

(87) PCT Pub. No.: WO2013/143141
PCT Pub. Date: Mar. 10, 2013

(65) Prior Publication Data
US 2014/0089330 A1    Mar. 27, 2014

(51) Int. Cl.
*G06F 17/30*    (2006.01)

(52) U.S. Cl.
CPC .... *G06F 17/30595* (2013.01); *G06F 17/30997* (2013.01)

(58) Field of Classification Search
None
See application file for complete search history.

(56) References Cited

U.S. PATENT DOCUMENTS

| 2008/0040126 A1 | 2/2008 | Estrada et al. | |
|---|---|---|---|
| 2008/0282198 A1 | 11/2008 | Brooks et al. | |
| 2009/0006387 A1* | 1/2009 | Tunkelang et al. | 707/5 |
| 2009/0287674 A1* | 11/2009 | Bouillet et al. | 707/5 |
| 2009/0292686 A1 | 11/2009 | Carter et al. | |
| 2010/0250190 A1* | 9/2010 | Zhang et al. | 702/181 |
| 2010/0332478 A1* | 12/2010 | Duman et al. | 707/738 |
| 2011/0153689 A1* | 6/2011 | Hall et al. | 707/813 |
| 2011/0282878 A1 | 11/2011 | Bird et al. | |

FOREIGN PATENT DOCUMENTS

CN      102129470 A      7/2011

OTHER PUBLICATIONS

Lee et al.; "Tag Refinement in an Image Folksonomy Using Visual Similarity and Tag Co-Occurrence Statistics"; Signal Processing: Image Communication; vol. 25, issue 10; Elsevier; 2010; pp. 761-773.*
Lee et al.; "Image Tag Refinement Along the 'What' Dimension Using Tag Categorization and Neighbor Voting"; Multimedia and Expo (ICME), 2010 IEEE International Conference on; pp. 48-53.*
Liu et al.; "Tag Quality Improvement for Social Images"; Multimedia and Expo, 2009. ICME 2009. IEEE International Conference on; pp. 350-353.*

(Continued)

*Primary Examiner* — Alex Gofman
*Assistant Examiner* — Umar Mian
(74) *Attorney, Agent, or Firm* — Ren-Sheng International (57) ABSTRACT

Techniques are generally described related to tag refinement strategy. One example method for refining homonyms and synonyms in a plurality of tags may include receiving, by a tag refinement system, a plurality of tagging actions each of which associates one or more of the plurality of tags with a digital object. The method may further include extracting, by the tag refinement system, a first subset of tags from the plurality of tags, wherein the first subset of tags have a higher collective relativity-similarity score comparing to a second subset of tags selected from the plurality of tags, and the first subset of tags, different from the second subset of tags, have a same predetermined tag count as the second subset of tags.

19 Claims, 6 Drawing Sheets

(56) References Cited

OTHER PUBLICATIONS

Liu et al.; "Content-Based Tag Processing for Internet Social Images"; Multimedia Tools and Applications; vol. 51, issue 2; Springer; 2011; pp. 723-738.*

Mario Kubek et al., "Automatic Taxonomy Extraction Through Mining Social Networks", In 8th International Workshop for Technical, Economic and Legal Aspects of Business Models for Virtual Goods, 2010.

Freddy Lipmens et al., "Linking Folksonomies and Ontologies for Supporting Knowledge Sharing: A State of the Art", ISICIL, 2009, pp. 1-45.

Harry Halpin et al., "The Complex Dynamics of Collaborative Tagging", In Proceedings of the World Wide Web, May 3-12, 2007, pp. 211-220.

Valentin Robu et al., "Emergence of Consensus and Shared Vocabularies in Collaborative Tagging Systems", ACM Transactions on the Web, Sep. 2009, pp. 1-30, vol. 3, No. 4.

Petros Venetis et al., "On the Selection of Tags for Tag Clouds", WSDM' 11, Feb. 9-12, 2011, Hong Kong, China.

Eugene Agichtein et al., "Finding High-Quality Content in Social Media", WSDM' 08, Feb. 11-12, 2008, Palo Alto, California, U.S.A.

Dong Liu et al., "Tag Ranking", In Proceedings of the World Wide Web, 2009, pp. 351-360.

Marina Drosou et al., "Search Result Diversification", SIGMOD Record, Mar. 2010, pp. 41-47, vol. 39, No. 1.

Paul Heymann et al., "Tagging Human Knowledge", WSDM' 10, Feb. 4-6, 2010, New York City, U.S.A.

Notification of Transmittal of the International Search Report and the Written Opinion of the International Searching Authority, PCT/CN2012/073403, Mar. 31, 2012.

* cited by examiner

Fig. 1

Fig. 2 input : A tag set T of objects in graph representation, relevance function w(.,.), similarity function s(.,.)
size of refined tag set k
output: refined subset $S_k$
Sort T based on w(t,q) in descending order;
state ← initial tag graph with no tags selected for tag set $S_k$
BestScore ← minimum score possible;
BestState ← Null;
SearchDepthFirst(state);
$S_k$ ← items that are SELECTED in BestState;
return $S_k$;

Fig. 3A

```
Function SearchDepthFirst(state)

SelCount ← count of tags selected in array state;
if SelCount = k AND BestScore <= GetScore(state) then
        BestScore ← GetScore(state);
        BestState ← state;
        return BestScore, BestState;
end
SearchRange ← {tag|tag not selected};
foreach tag i in SearchRange do
        if GetBound(state U i) > BestScore then
                SearchDepthFirst(state U i)
        end
end
return BestScore, BestState
```

TAG REFINEMENT STRATEGIES FOR SOCIAL TAGGING SYSTEMS

CROSS-REFERENCE TO RELATED APPLICATION

The present application is a U.S. National stage filing under 35 U.S.C. §371 application of International Application PCT/CN2012/073403, filed on Mar. 31, 2012 and entitled "TAG REFINEMENT STRATEGIES FOR SOCIAL TAGGING SYSTEMS." The International Application, including any appendices or attachments thereof, is incorporated by reference herein in its entirety.

BACKGROUND

The amount of user generated web contents, such as videos, photos, tweets, web pages, and user comments, have been growing exponentially. Various collaborative methods have been introduced to manage these ever-increasing online contents. For example, social tagging may be a collaborative method in which online users may provide descriptive words to mark the contents that are either uploaded or viewed by them. Another example may be hash-tags that are used by tweeter users to annotate their tweets.

Comparing to the traditional editor-controlled vocabulary, there is no limit to the keywords that are provided by online users for annotating the pages, photos or tweets. The census voting power of these users can provide rich facets for describing web contents, and these convenient ways of organizing contents have gained significant popularity in the Web 2.0 era. However, the user-provided annotations may not always be accurate. For example, users with less experience may introduce noise words that are misleading or wrong into the annotation vocabulary. Different users may choose synonyms to describe a common concept. And some generic words used for content-marking may be too obvious or have no substantial meaning. Thus, these heuristics may diminish the concise representation of the contents, and may affect subsequent browsing and searching of these contents on the web.

SUMMARY

In accordance with some embodiments of the present disclosure, a method for refining homonyms and synonyms in a plurality of tags is provided. The method may include receiving, by a tag refinement system, a plurality of tagging actions each of which associates one or more of the plurality of tags with a digital object. The method may further include extracting, by the tag refinement system, a first subset of tags from the plurality of tags, wherein the first subset of tags have a higher collective relativity-similarity score comparing to a second subset of tags selected from the plurality of tags, and the first subset of tags, different from the second subset of tags, have a same predetermined tag count as the second subset of tags.

In accordance with other embodiments of the present disclosure, another method for refining homonyms and synonyms in a plurality of tags is provided. The method includes receiving, by a tag refinement system, a plurality of tagging actions each of which associates one or more of the plurality of tags with a digital object. The method may also include generating, by the tag refinement system, a tag graph having a plurality of nodes linked by a plurality of edges, wherein each of the plurality of nodes is associated with one of the plurality of tags, and each of the plurality of edges is associated with a corresponding co-occurrence relationship existed in the plurality of tagging actions. The method may further include extracting, by the tag refinement system, a first subset of tags from the plurality of tags by recursively processing the tag graph to select nodes based on their respective relativity-similarity scores, wherein the first subset of tags have a higher collective its relativity-similarity score comparing to a second subset of tags that are selected from the plurality of tags.

In accordance with further embodiments of the present disclosure, a system for refining homonyms and synonyms in a plurality of tags is provided. The system includes a tag list for storing a plurality of tagging actions each of which associates one or more of the plurality of tags with a digital object. The system may further include a tag refinement system coupled with the tag list for extracting a first subset of tags from the plurality of tags, wherein the first subset of tags have a higher collective relativity-similarity score comparing to a second subset of tags selected from the plurality of tags, and the first subset of tags, different from the second subset of tags, have a same predetermined tag count as the second subset of tags.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatuses, computer programs, and systems related to tag refinement strategies. A "tag" may be referring to a label that is associated with a specific digital object. A digital object may be a digitized piece of information (e.g., without limitation, text, file, web page, image, video, sound, tweets) that is identified by a universal resource locator (URL). In other words, a tag may be a word or a short sentence to describe, annotate, and provide context to, the specific digital object. A "tagging action", or "tagging", may refer to an action to annotate/associate one or more tags with the specific digital object. For example, to annotate a digital object located on a web site and can be accessed via a URL "http://www.cnn.com", a tagging action may associate a first tag, "news," and a second tag, "media provider," to this digital object. Afterward, by looking at the tags "news" and/or "media provider", any user may be able to quickly grasp the context of the digital object that is referenced by the above URL.

Figure 1:
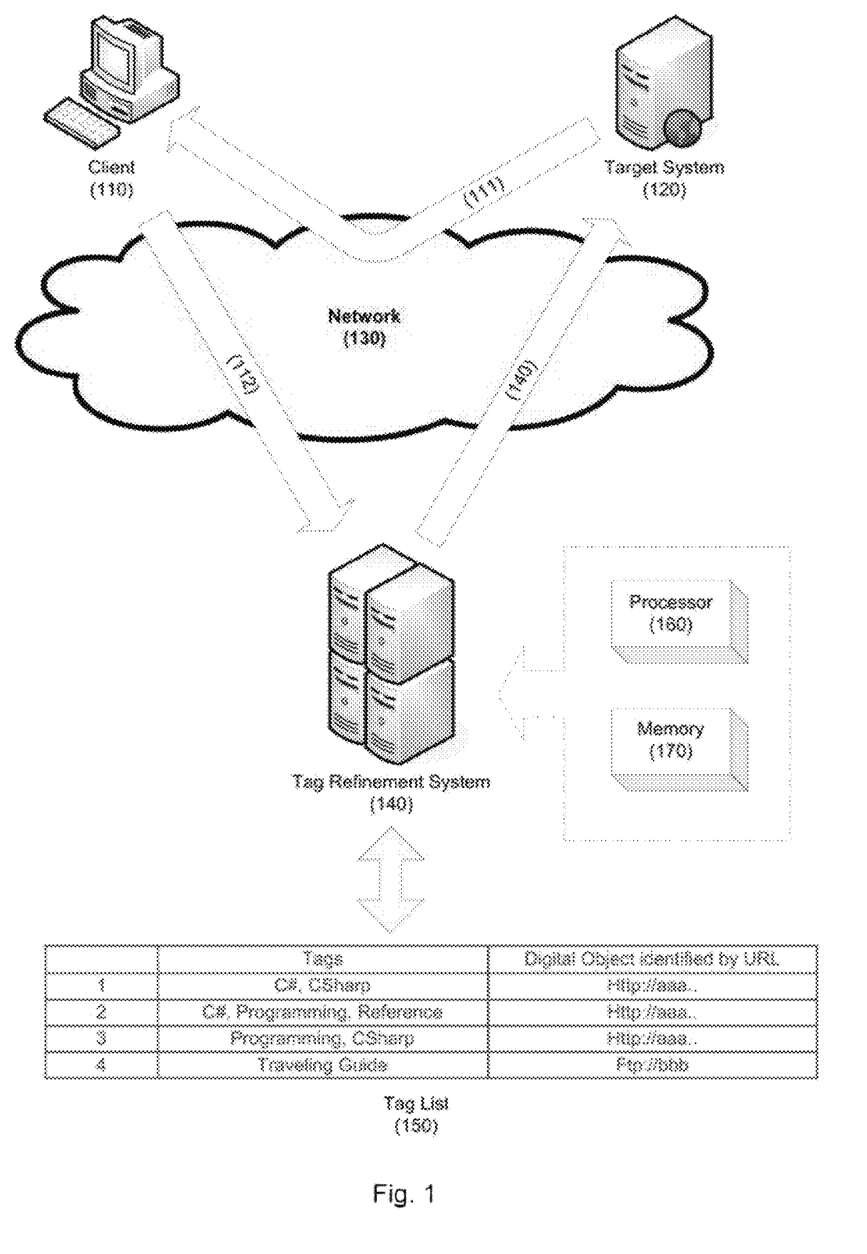
FIG. 1 shows a block diagram of an operational environment, in which illustrative embodiments of a tag refinement system are presented.

FIG. 1 shows a block diagram of an operational environment, in which illustrative embodiments of a tag refinement system are presented. In FIG. 1, a client system 110 may be operating standalone or communicating with a target system 120 via a network 130. The client 110 or the target system 120 may be a computer system or a client program executing on a computer system. Exemplary client 110 or target system 120 may include, without limitation, conventional personal computer (PC), workstation, laptop, tablet PC, handheld computing/communication device, cell phone, smart phone, or a similar device. The network 130 may be, for example, a local area network (LAN), wide area network (WAN), metropolitan area network (MAN), global area network such as the Internet, a mobile network (e.g., GSM, CDMA, 3G), or any combination of such interconnects.

In some embodiments, the client 110 may request for one or more digital objects that are either stored in the client 110, or located on the target system 120. To remotely access a digital object identified by a URL and located on the target system 120, the client 110 may transmit a user request 111 to the target system 120. The user request 111 may also be originated from a user-invoked or an event-triggered software program running on the client 110. Based on the URL, the user request 111 may be routed by the network 130 to the target system 120. The target system 120 may contain a web server application such as Apache® HTTP Server, or Microsoft® Internet Information Server, etc., to process the user request 111 in HTTP. Similarly, the target system 120 may contain customized software programs to handle the user request 111.

In some embodiments, the client 110 may utilize a tag refinement system 140 for tagging and managing the digital objects it requests for. When a user on the client 110 wants to tag a specific digital object, it may initiate a tagging action which contains the one or more tags the user choose, and the URL for the specific digital object to be tagged. The tagging action may be transmitted (112) to the tag refinement system 140, while the specific digital object may be stored in the client 110 or located at the remote target system 120. When the digital object is located at the target system 120, the tag refinement system 140 may optionally validate the existence of the specific digital object for the client 110 via a confirmation request 140. Upon a determination that the specific digital object exists and is valid, the tag refinement system 140 may process the tagging action and store the relevant information to a tag list 150. Afterward, the original client 110 or another client 110 may access the tag list 150 to evaluate, update, and/or retrieve the tags that are associated with different digital objects.

For example, in the tag list 150, a first tagging action may be received to tag a digital object identified by a URL (http://aaa . . . ) with two tags (C# and CSharp). That is, the tagging action may be provided by a user on the client 110 to associate the is two tags with the digital object. Afterward, the tags may be used to identify and provide context to the digital object identified by the URL. In some embodiments, the tag refinement system 140 may receive multiple tagging actions from one or more clients 110 for tagging the same digital object. In tag list 150, a second tagging action may use three tags (C#, Programming, and Reference) for annotating the digital object that is identified by the same URL (http://aaa . . . ). And a third tagging action may use tags "Programming" and "CSharp" for tagging the same digital object. The tag list 150 may also store other tags for a different digital object (e.g., one that is identified by the URL http://bbb . . . ).

In some embodiments, the tag refinement system 140 may refine the multiple tags in the tag list 150 that are associated with a common digital object, so that a subset of the tags (or "tag subset") may be extracted from the multiple tags. The subset of the tags may not only represent the multiple tags for identifying the content of the digital object, but also minimize the noise and redundancy that may exist in the multiple tags. For example, the tag refinement system 140 may extract two tags (C# and Programming) from the multiple tags in the tag list 150 to represent the digital object. In this case, the extracted two tags may be deemed a tag subset that substantially covers most, if not all of the tags that reference the digital object. In the extracted tag subset, "CSharp", which is synonym to C#, is not included. Likewise, the extracted tag subset may select one of the homonyms, such as ".net" and "dotnet". Thus, the tag refinement system 140 may refine the homonyms and synonyms that may be present in the tag list 150. The details of the tag refinement system 140 may be further described below.

In some embodiments, the tag refinement system 140 may include one or more processors 160, memory 170, and other system components. The processor(s) 160 may include central processing units (CPUs) for controlling the overall operation of the tag refinement system 140. In some embodiments, the processor(s) 160 accomplish this by executing software or firmware stored in memory 170. The memory 170 is or includes the main memory of the tag refinement system 140. In use, the memory 170 may contain, among other things, a set of machine instruments which, when executed by processor 160, causing the processor 160 to perform embodiments of the present disclosure.

Figure 2:
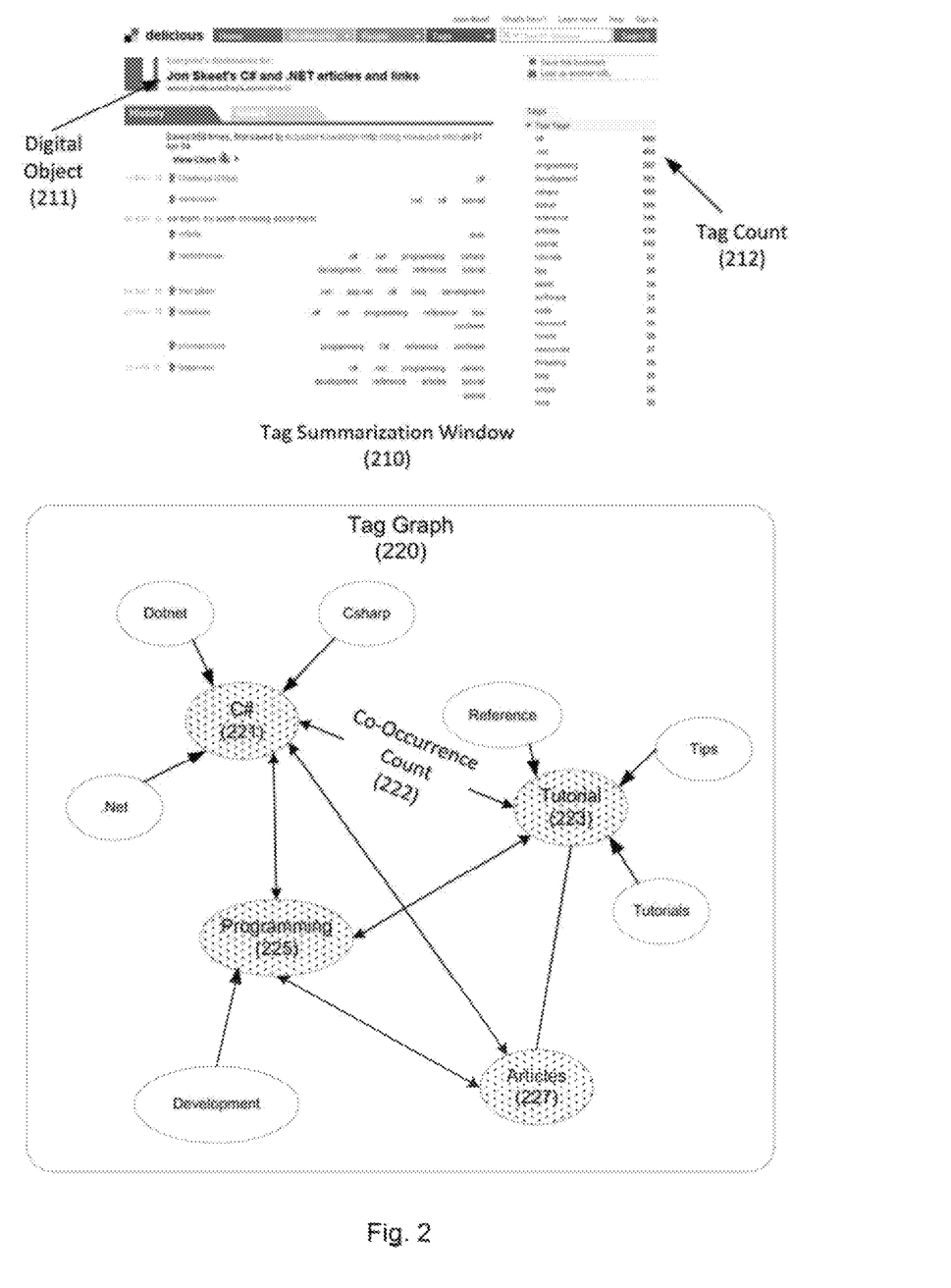
FIG. 2 shows illustrative embodiments of tag summarization and tag graph.

FIG. 2 shows illustrative embodiments of tag summarization and tag graph. In FIG. 2, a tag summarization window 210, which may be maintained and displayed by a tag refinement system, may be configured to show a summarized view of a set of tags being associated with a particular digital object 211. The digital object 211 may be an online book that is accessible by a URL address. After receiving multiple tagging actions submitted by various users, the tag refinement system may store the tags in a tag list (not shown in FIG. 2), and generate a summarized view of the tags for the digital object 211 in the tag summarization window 210.

The exemplary tag summarization window 210 shows multiple users have supplied various tags for tagging the digital object 211. For example, in a first tagging action, a first user may annotate the digital object 211 with a tag "C#." And in a second tagging action, a second user may annotate the digital object 211 with three tags ".net", "C#", and "Tutorial" at the same time. On the right side of the tag summarization window 210, all tags that have been introduced by users for tagging the digital object 211 may be listed and sorted based on the corresponding tagging counts. For example, tag "C#" has a tag count of 680, meaning the tag "C#" has been used 680 times in various tagging actions for tagging the digital object 211.

As indicated by the tag summarization window 210, the tagging actions may be deemed a form of social collaboration having a census nature. By analyzing these abundant descriptions for the targeted digital object 211, one may discover that some tags (e.g., "C#", "Programming" and "Reference") may have a much higher occurrence frequency than other tags (such as "Threading" and "Howto"). There are also some tags that are redundant. For example, ".net" and "dotnet" are homonyms with different forms. And "C#" and "CSharp" may be synonym to each other. The tags "Articles", "Reference", and "Howto" may also have very generic meanings which do not provide substantial information. In some extreme cases, there may be tags that are noise, as they may give either a misleading or wrong meaning to the content of the digital object 211. Typical of this kind of collaborative annotation process, since different users may have different perspectives, tags used to describe the same concept may be vastly different. Therefore, a summarized subset of tags may be valuable to provide a more concise representation of the is digital object 211.

In some embodiments, the goal to extract a subset of meaningful and representative tags from all the tags that reference the same digital object may be characterized as a tag extraction problem. For a social tagging system that contains users U, tags T, and digital objects O (U represents an unique user list that contains multiple users, T represents an unique tag list that contains multiple tags, and O represents an unique object list that contains multiple digital objects), the annotation of one or more tags to a digital object may be defined as a tagging action denoted by a triple (T, u, o), where a user u∈U assigns multiple tags $\{t_1, t_2, \ldots, t_n\} \in T$ to a digital object o∈O.

In some embodiments, within a tag space that covers a tag set T annotating a specific digital object o, each tag in the tag set T may have a tag count showing how many times it has been used in the tagging actions for annotating o. Further, a first tag may have co-occurrence relations with a second tag when the first tag and the second tag are both used for annotating the same digital object in one or more tagging actions. In other words, between any two tags of T in a tagging action (T, u, o), there exists one co-occurrence relationship when a tagging action may use these two tags for annotating the same digital object o.

In some embodiments, two scoring functions may be used to measure the above tag space contributed by massive tagging actions. First, the popularity of tags may be defined by a relativity scoring function $$w(t,o): T \times O \rightarrow R+,$$

in which the greater the tag count for a specific tag t, the greater the relativity score of w(t,o) for the tag t with respect to a digital object o.

Second, the diversity of tags to the targeted digital object may be shown by a similarity scoring function $$s(t1,t2): U \times U \rightarrow R+,$$

in which the higher correlation between two tags, the greater the similarity score of s(t1, t2) for the two tags t1 and t2.

In some embodiments, a tag graph 220 may be used to illustrate the tags and the relationships among these tags. In the tag graph 220, the oval-shaped nodes may represent tags, and the edges connecting the nodes may represent the co-occurrence relationships among the tags. Thus, the tag graph 220 may be an undirected and weighted graph denoted as G=(V,E), where the weight of each node v∈V may represent the tag count for the corresponding tag, and the weight of each edge $(t_1,t_2) \in E$ may represent the frequency of two corresponding tags' co-occurrence relationships. In the example as shown by tag graph 220, the node 221 may represent tag "C#", with a weight value (relativity score) that is calculated by the above relativity scoring function w(t,o). The edge 222 may represent the co-occurrence relationship between tags "C#" and "Tutorial", with a weight value (similarity score) that is calculated based on the above similarity scoring function s(t1, t2).

In some embodiments, given a digital object o∈O and a set of associated tags $T=\{t_1, t_2, \ldots, t_n\}$, the tag extraction problem may be characterized as finding a subset of tags $S_k \in T$ that may represent the tag list T and the underlying tagged digital object. An ideal subset of tags (or "tag subset") should be a good summarization of the whole tag set T, and should cover enough facets of the target digital object. In the collaborative social annotation domain, there may exist a lot of noise and redundant tags. Thus, the ideal tag subset should have high relativity scores and high similarity scores within the tag set T.

In some embodiments, the high relativity scores may mean the tag subset may have high coverage and usages by the users. Tags most frequently used by most of the users may be good candidates to act as indicators to the general topics in the tag set T. The high similarity scores may mean that in the tag set T, the tag subset has better overall popularity comparing to the rest of tags in the tag set T. The similarity scores ensure the chosen tags in the tag subset are different between them and at the same time cover more facets of the digital object. Based on the above scores, the tag subset may be valuable in helping the users to quickly grasp the characteristics of the digital object.

In some embodiments, to achieve the above multi-objective goal of high relativity scores and high similarity scores, a multi-objective function for extracting is the tag subset S from the tag set T and provide a solution to the tag extraction problem may be designed as the following:

$$f_1(S, o, w(.), s(\cdot, \cdot)) = \sum_{t \in S} w(t) + \sum_{t \in (T-S)} s(t, t') w(t)$$

Specifically, for a given object o, the previously defined similarity scoring function may be abbreviated from w(t, o) to w(t) in the above function. The s(t, t') in the above function measures the similarity between tag t and tag t', where tag t belongs to the selected tag subset S, and tag t' is a tag that does not belong to S and has the maximal similarity score with tag t. For a specific tag t, the output of the above multi-objective function may be deemed a relativity-similarity score, in which the relativity score and the similarity score for tag t are both taken into the consideration. For a subset S of tags, the sum of the relativity-similarity scores of all the tags in the subset S may be deemed a collective relativity-similarity score for the subset S.

Therefore, the above multi-objective function is monotonically linear with coverage metrics w(t). When a similarity score is fixed, the value of the multi-objective function is related to the coverage metrics w(t). In this situation the multi-objective function may be regarded as w(t)'s function of the first degree, so it is monotonically linear with coverage metrics w(t). At the same time, this multi-objective function may take the similarity scores between neighboring tags into consideration, namely the s(t,t') scores. As the similarity scores measure the overall graph connections, this multi-objective function may cover the graph connection information. Further, the above multi-objective function combines the enumerations of the possible candidate tag subsets, and finds the best (if not possible, then the optimal) solution in an optimization function similar to the following one, in which S* is the optimal solution for the tag extraction problem:

$$S_k^* = \underset{S_k \in T, |S_k|+k}{\operatorname{argmax}} f(S_k, o, w(.), d(\cdot, \cdot)).$$

In some embodiments, for a tag set T, the number of possible tag subsets S having k elements may grow exponentially with the increasing of k. To find the best solution for the above multi-objective function, the searching through all possible combinations of tags to find the best possible tag subset may not be tolerable, and the calculation may further increase exponentially with the increasing of n elements in tag set T. Thus, finding a best solution for the above tag extraction function may be a NP-hard enumeration problem. Rather than resorting to the greedy or heuristic ways to find meaningful extraction results, an approximation algorithm to select top k representative tags for the tag subset may be used, along with additional search-pruning techniques in order to reduce the searching space. The details of finding the approximation solution may be further described below.

In some embodiments, extracting the tag subset from the tag set T may be illustrated as finding a partition in the tag graph 220. As illustrated by tag graph 220, after extraction, the dot-filled nodes may be deemed a member of the tag subset, and the unfilled nodes may be excluded from the tag subset. Thus, in the example shown by tag graph 220, a tag subset containing four tags (C#, Programming, Tutorial, and Articles) may be extracted for representing all the tags in the tag graph 220. In contrast, the synonyms and homonyms such as "CSharp" or "dotnet" are not selected for the tag subset.

Figure 3A:
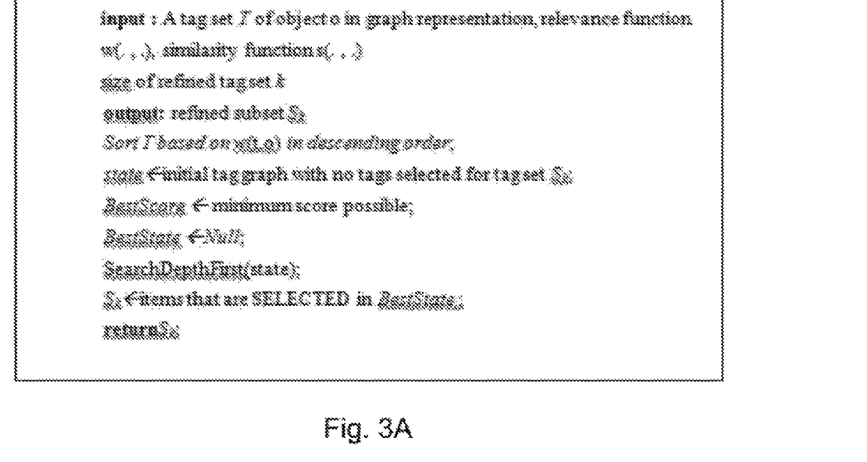
FIGS. 3A-3B show pseudo codes for illustrative embodiments of an approximation process to extract and refine a tag subset from a tag set.
Figure 3B:
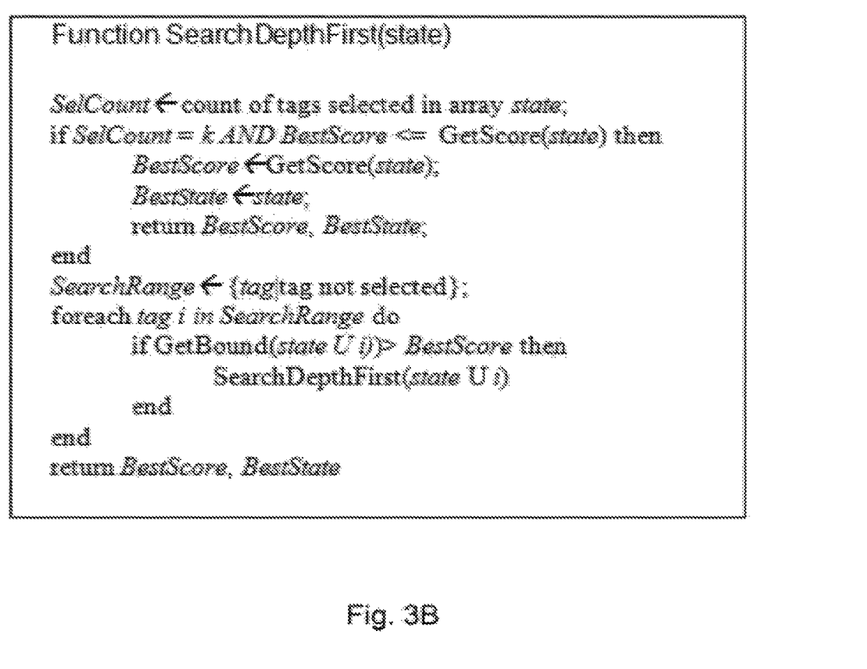

FIGS. 3A-3B show pseudo codes for illustrative embodiments of an approximation process to extract and refine a tag subset from a tag set. In some embodiments, after obtaining a tag set T for annotating a digital object o, a tag refinement system may first generate a tag graph (similar to the tag graph 220 of FIG. 2) for the tag set with nodes representing the tags, and the edges representing the co-occurrence relationships existed in the tag set. The tag refine system may further populate the nodes with relativity scores calculated using the above relativity scoring function w(. , .), and populate the edges with similarity scores generated using the above similarity scoring function s(. , .).

In some embodiments, the tag subset may have a refined size of k, which is a predetermined tag count that has a fixed value and is substantially smaller than the total number of tags in the tag set. In FIG. 3A, the tag refinement system may sort the nodes of the tag graph in a sorting order (e.g., descending) based on the nodes' corresponding relativity scores. The variable state may be used to store tag graph having nodes being selected for the tag subset, the variable BestScore is for storing a temporary best score, and the variable BestState may store the tag graph that have all tags for the tag subset identified. In an initialization process, the above variables may be set to an initial value: state is set to the tag graph having no tag selected for tag subset; BestScore is set to the minimum score (e.g., 0); and BestState is set to be empty.

After initialization, the core searching function SearchDepthFirst( ) may be invoked by the tag refinement system to find the optimal tag subset. The SearchDepthFirst may employ the depth-first recursive search methods with pruning, in order to find the optimal tag subset that maximizes the objectives described above. After finding the k number of optimal tags, the SearchDepthFirst( ) may extract those tags from the BestState (which contains the tag graph having k number of optimal tags identified) into tag subset $S_k$. The tag subset $S_k$ may be deemed the refined subset of tags, and may be outputted from the process in FIG. 3A.

FIG. 3B provides additional details to the above searching function SearchDepthFirst( ). When the upper bound of the multi-objective function is given, the process in FIG. 3B estimates the multiple conditions in the connected search range, while the actual partition operation is embedded in the selected search range and comparison. In FIG. 3B, the input state may be the tag graph state that has no tags selected. The BestScore and BestState variables may be correlated to each other, and may be deemed the outputs. The variable SelCount is a counter that stores the number of tags that are already selected for the tag subset. SearchRange may be a tag set that contains all the current unselected tags. And the function GetScore( ) implements the above-mentioned multi-objective function f1 ( ) calculated based on the given state variable.

In FIG. 3B, the function GetBound( ) may be an estimating function that gives the maximal possible values of the objective function (f1 ( )) based on a specific given state. For example, given one specific state, the function GetBound( ) may calculate the upper bound of the multi-object function f1 ( ) which may be deemed a temporary value that holds a potentially highest possible value for the specific state. Based on the temporary value, a pruning process may be adapted. That is, if this potentially highest possible value of this state is less than a score obtained from another state that is currently considered to be the "best" state, then this particular state is "pruned", meaning no further consideration is given to this particular state.

In some embodiments, the number of already selected tags is stored in the is variable SelCount. If SelCount equals the predetermined tag count k for the refined tag subset, it means that a new tag subset is found and may potentially be the tag subset to represent the original set of tags. Next, this new tag subset may be evaluated using the multi-objective function to determine whether under this given state, this new tag subset has a higher value than the current BestScore. If the new tag subset has a higher value, meaning the new tag subset is better than the current best set of tags in BestState, the tag graph in the variable state may be assigned to BestState, and the higher value may be stored as the new BestScore. Afterward, the process in FIG. 3B returns back to the process in FIG. 3A. Otherwise, the current un-chosen tags may be added to the tag set SearchRange. For each tag i in the SearchRange, the maximal possible value for the multi-objective function f1 ( ) may be calculated under the current chosen tags and tag i. If the value outputted from the f1 ( ) function is lower than the BestScore, there is no need to choose tag i any more. In this way, the tag i is "pruned", and the depth-first-search will not be conducted based on the tag i. The depth-first search may continue for the tags that have a multi-object function f1 ( ) value that is higher than the current BestScore.

Supposing there are N tags in the tag set T, and M tags in the current selected tag subset S, which are labeled as {t1, t2 . . . tm}. In order to get the upper bound objective function value of this given state, the getScore( ) function is used to get the current f1 value of tag set S as basic score, and for each tag ti not in tag set S, the corresponding w(ti) value to the basic score may be added. This way, upper bound score may be obtained. The upper bound score may then be compared with the current best score. If the upper bound score is better than the current best score, the tag graph represented by the variable state may be pruned. The upper bound score may be mathematically represented as below:

$$xs(t, t') \leq 1$$

$$\therefore f_1(S, o, w(.), s(\cdot, \cdot)) =$$

$$\sum_{t \in S} w(t) + \sum_{t \in (T-S)} s(t, t')w(t) \leq \sum_{t \in S} w(t) + \sum_{t \in (T-S)} w(t) = \sum_{t \in T} w(t)$$

Specifically, s(t,t') generates a similarity score which measures the similarity between tag t and tag t', and has a value between 0 and 1. If the similarity score equals 1, it means that tag t is the same as tag t'. If the similarity score equals 0, it means that tag t is so different from tag t' that these two tags share no similarity. The higher the value of function s( ) the more similarity tag t and tag t' may share. Further, a cosine function, which is defined below, may be used as one kind of similarity function s(t,t'):

For n-dimensional vector x and y, $x=(x_1, x_2, \ldots x_n)$, $y=(y_1, y_2, \ldots y_n)$, the cosine similarity between x and y has a value of:

$$(x_1*y_1+x_2*y_2+\ldots +x_n*y_n)/(|x|*|y|);$$

where $$|x|=\mathrm{sqrt}(x_1*x_1+x_2*x_2+\ldots +x_n*x_n),$$

and $$|y|=\mathrm{sqrt}(y_1*y_1+y_2*y_2+\ldots +y_n*y_n).$$

Figure 4:
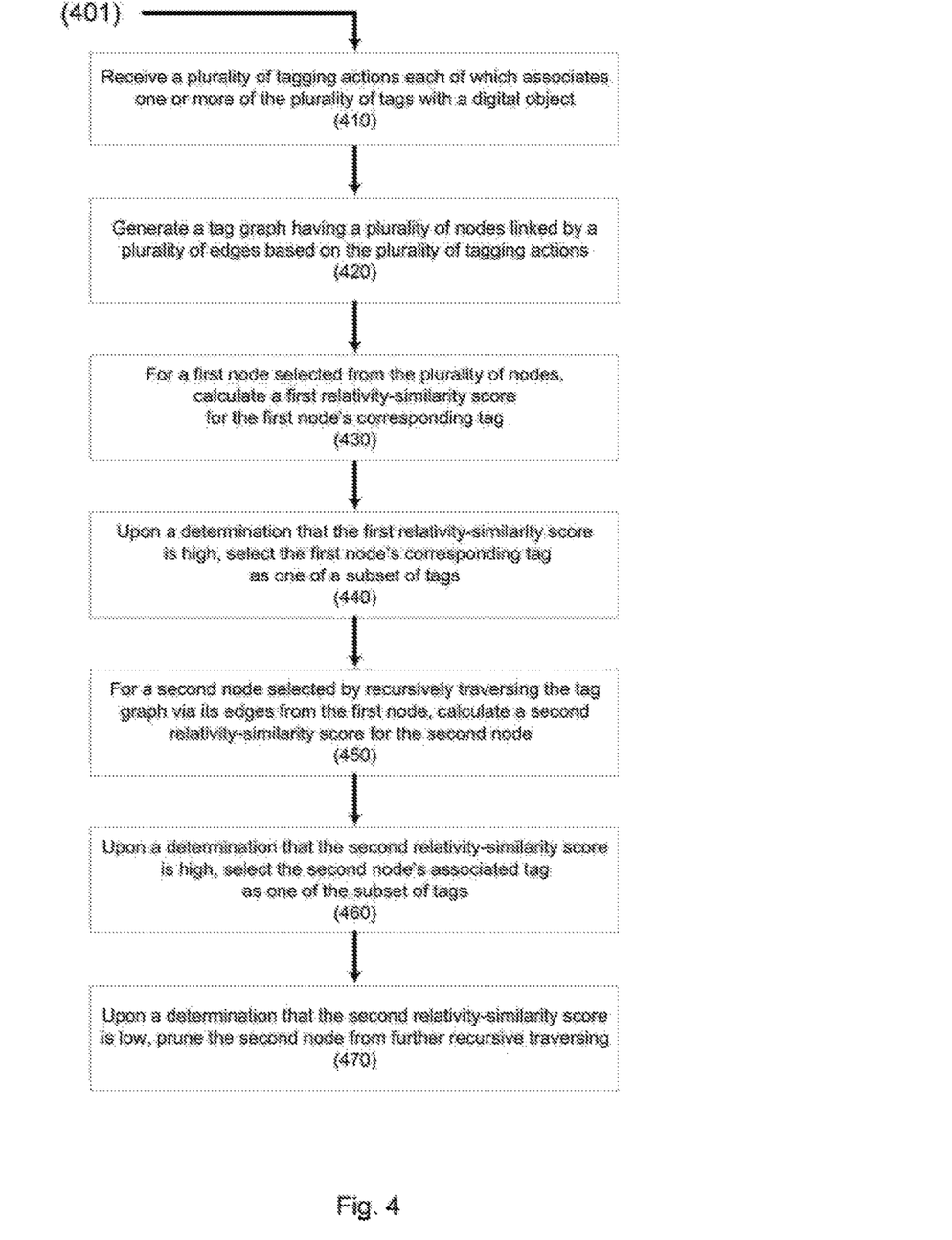
FIG. 4 shows a flow diagram of an illustrative embodiment of a process for implementing a tag refinement strategy.

FIG. 4 shows a flow diagram of an illustrative embodiment of a process for implementing a tag refinement strategy. The process 401 may include one or more operations, functions, or actions as illustrated by blocks 410, 420, 430, 440, 450, 460, and/or 470, which may be performed by hardware, software and/or firmware. The various blocks are not intended to be limiting to the described embodiments. For example, one skilled in the art will appreciate that, for this and other processes and methods disclosed herein, the functions performed in the processes and methods may be implemented in differing order.

Furthermore, the outlined steps and operations are only provided as examples, and some of the steps and operations may be optional, combined into fewer steps and operations, or expanded into additional steps and operations without detracting from the essence of the disclosed embodiments. Although the blocks are illustrated in a sequential order, these blocks may also be performed in parallel, and/or in a different order than those described herein. In some embodiments, machine-executable instructions for the process 401 may be stored in memory, executed by a processor, and/or implemented in a computer system of FIG. 1.

At block 410, a tag refinement system may receive a plurality of tagging actions from a client via a network. The tagging actions may contain a plurality of tags, and each of the plurality of tagging actions associates one or more of the is plurality of tags with a digital object. At block 420, the tag refinement system may generate a tag graph having a plurality of nodes linked by a plurality of edges. Each of the plurality of nodes may be associated with one of the plurality of tags, and each of the plurality of edges is associated with a corresponding co-occurrence relationship existed in the plurality of tagging actions.

In some embodiments, the tag refinement system may assign each of the plurality of nodes in the tag graph with a relativity score. The relativity score for a specific node may be determined based on a number of occurrences of a tag, which is corresponding to the specific node, in the plurality of tagging actions. Further, the tag refinement system may assign each of the plurality of edges with a similarity score. The similarity score for a specific edge may be determined based on a number of co-occurrence relationships between the two tags corresponding to the two nodes that are linked by the specific edge.

At block 430, the tag refinement system may select a first node from the plurality of nodes, and calculate a first relativity-similarity score for the first node's corresponding tag. In some embodiments, the first node is selected from a list of nodes that are sorted in a descending order (from largest to the smallest) based on the nodes' relativity scores stored in the tag graph. In other words, the first node may have the highest relativity scores among the plurality of tags. The tag refinement system may calculate the first relativity-similarity score based on the first node's relativity score and the similarity scores of all the edges that are connected with the first node in the tag graph. Specifically, the relativity-similarity score may be generated by adding the relativity score and a relativity value, which is calculated by multiplying the relativity score with a highest similarity score selected among the edges that are connected with the first node, as illustrated by the multi-objective function shown above.

At block 440, the tag refinement system may evaluate the first relativity-similarity score against a temporary score (e.g., the BestScore as shown in FIG. 3B). If the first relativity-similarity score is higher than the temporary score, then the first node's corresponding tag may be selected as one of the subset of tags. And the first relativity-similarity score may be set as the new temporary score. Alternatively, if the first relativity-similarity score is not high compared with the temporary score, then the tag refinement system may select another node from the sorted list of nodes, and perform operations similar to ones in block 430. In some embodiments, the first relativity-similarity score may be compared with relativity-similarity scores of those of the plurality of tags that do not belong to the subset of tags, and if the first relativity-similarity score is higher, then the tag associated with the first node may be selected as one of the subset of tags.

At block 450, the tag refinement system may select a second node by recursively traversing the tag graph via the edges starting from the first node. In other words, a depth-first-search may be conducted by starting from the first node and recursively traversing the second-level nodes that are connected via edges to the first node. Further, nodes on third or additional levels may be similarly recursively-traversed based on the second-level nodes, and so on. In some embodiments, the second node may be the one that is connected with the first node, and has the highest relativity score. Alternatively, the second node may be the one that has the highest number of co-occurrence relationships with the first node. Further, the second node may be selected from the plurality of nodes based on the sorting order in the plurality of edges. After ascertaining the second node, the tag refinement system may calculate a second relativity-similarity score for the second node, similar to the calculation of the first relativity-similarity score performed at block 430.

At block 460, the tag refinement system may compare the second relativity-similarity score to a temporarily score or relativity-similarity scores of those tags that do not belong to the subset of tags. If the second relativity-similarity score is deemed higher, the second node's associated tag may be selected as one of the subset of tags. If the subset of tags already contains a predetermined tag count of tags, then one of the subset of tags which has a relativity-similarity score that is lower than the second relativity-similarity score may be replaced by the second node's associated tag.

At block 470, upon a determination that the second relativity-similarity score is deemed lower, the tag refinement system may prune the sub-branches of the tag graph, which are connected with the second node, from further recursive traversing. That is, no sub-level nodes that are connected via edges to the second node may be further traversed. Such an approach may greatly simplify the tag refinement and extract process. Thus, the tag refinement system extracts the subset of tags having a predetermined tag count from the plurality of tags by recursively processing the tag graph. The extracted subset of tags may have high collective relativity-similarity scores than any other set of tags that have the same predetermined tag count of tags.

In some embodiments, the tag refinement system may extract the subset of tags by selecting a first subset of tags having the predetermined tag count from the tags. The tag refinement system may then calculate a collective relativity-similarity score for the first subset of tags by summing up the corresponding relativity-similarity score of each tag in the first subset of tags. Upon a determination that the first collective relativity-similarity score is higher than a corresponding collective relativity-similarity score of a different subset of tags (selected from the plurality of tags, having the same predetermined tag count, but not being identical to the first subset of tags), the first subset of tags may be deemed the subset of tags.

In some embodiments, the tag refinement system may select a second subset of tags that is different from the first subset of tags but have the same predetermined tag count. Afterward, a second collective relativity-similarity score may be calculated for the second subset of tags. If the second collective relativity-similarity score is higher than the first collective relativity-similarity score, then the second subset of tags may be deemed the subset of tags in lieu of the first subset of tags.

Figure 5:
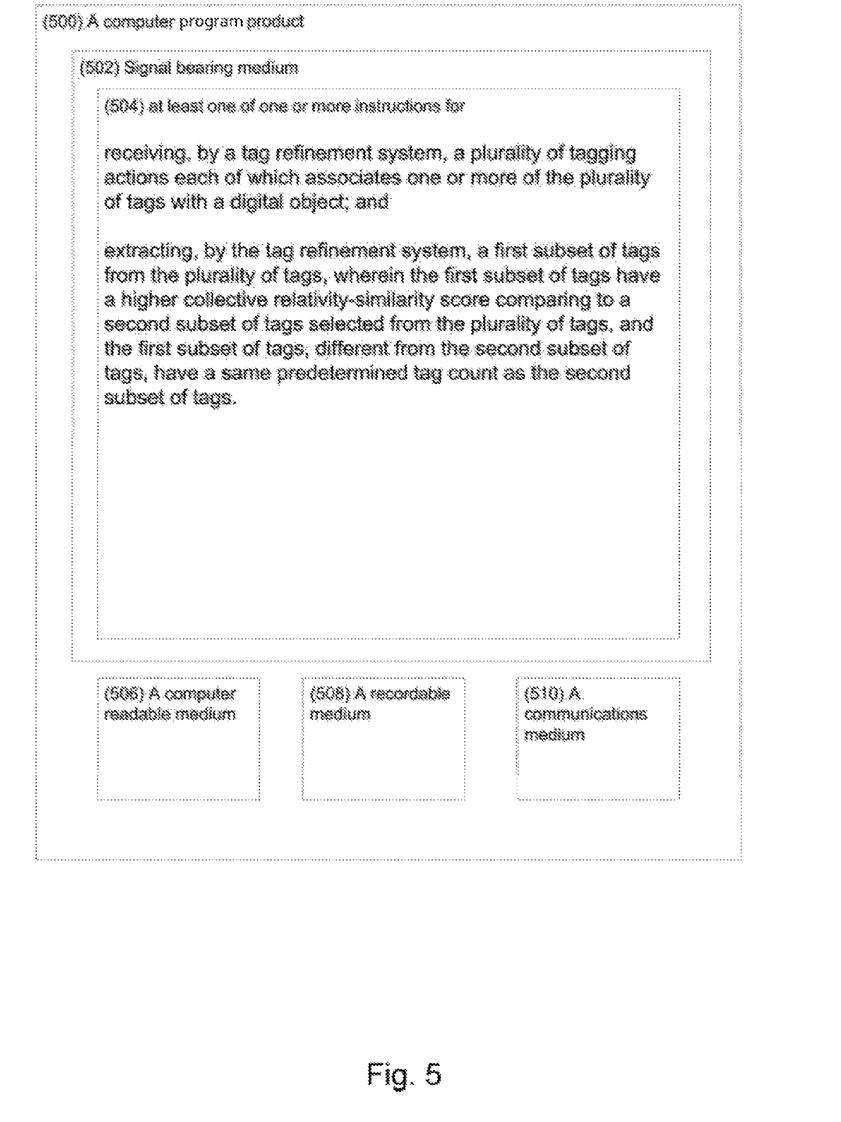
FIG. 5 shows an illustrative embodiment of an example computer program product.

FIG. 5 is a block diagram of an illustrative embodiment of a computer program product 500 for implementing a method for tag refinement strategies. Computer program product 500 may include a signal bearing medium 502. Signal bearing medium 502 may include one or more sets of executable instructions 504 that, when executed by, for example, a processor, may provide the functionality described above. Thus, for example, referring to FIG. 1, the computer system, may undertake one or more of the operations shown in at least FIG. 4 in response to the instructions 504.

In some implementations, signal bearing medium 502 may encompass a non-transitory computer readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, referring to FIG. 1, computer program product 500 may be wirelessly conveyed to the computer system 110 by signal bearing medium 502, where signal bearing medium 502 is conveyed by communications medium 510 (e.g., a wireless communications medium conforming with the IEEE 802.11 standard). Computer program product 500 may be recorded on non-transitory computer readable medium 506 or another similar recordable medium 508.

Figure 6:
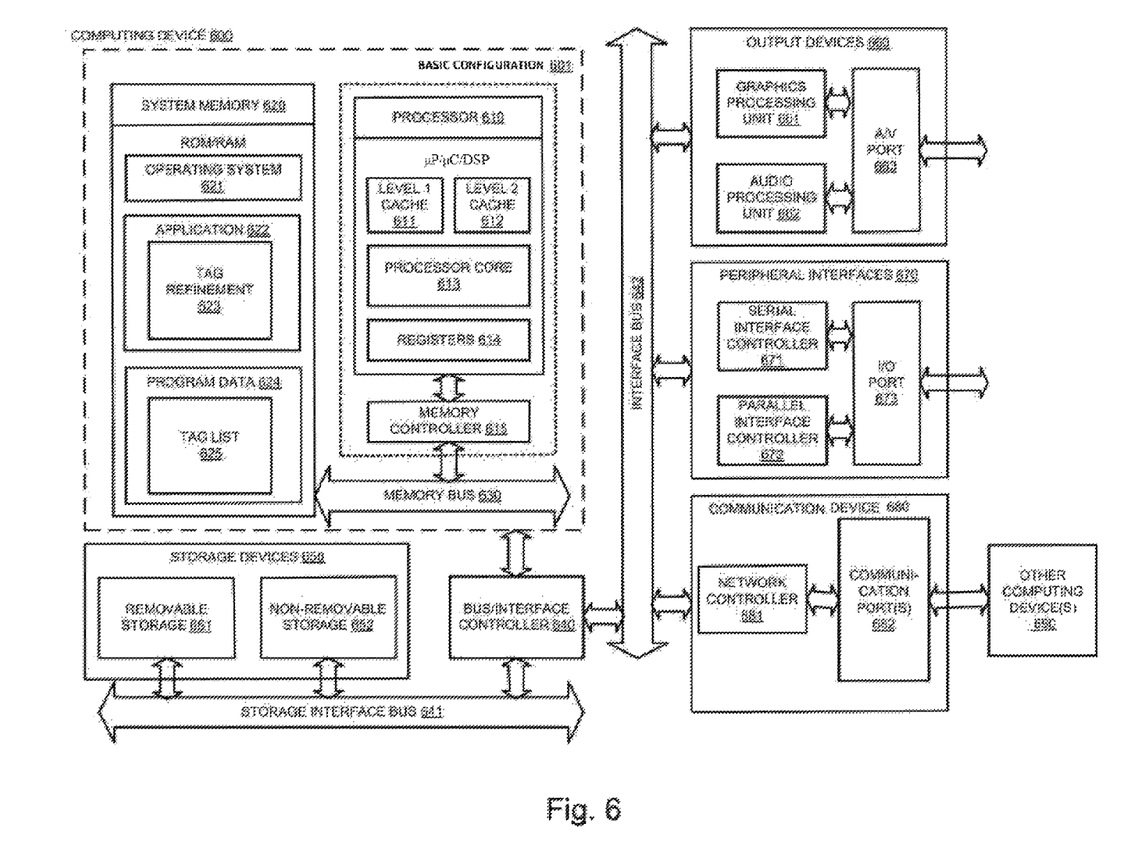
FIG. 6 shows a block diagram of an illustrative embodiment of an example computer system, all arranged in accordance to at least some embodiments of the present disclosure.

FIG. 6 shows a block diagram of an illustrative embodiment of an example computing device 600. In a very basic configuration 601, the computing device 600 may include one or more processors 610 and a system memory 620. A memory bus 630 may be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 can include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 may be of any type including but not limited to volatile memory (such as RAM), non-volatile is memory (such as ROM, flash memory, etc.) or any combination thereof. The system memory 620 may include an operating system 621, one or more applications 622, and program data 624. The application 622 may include a tag refinement 623 that is arranged to perform the functions and/or operations as described herein including at least the functional blocks and/or operations described with respect to the process 401 of FIG. 4. The program data 624 may include tag list 625 to be accessed by the tag refinement 623. In some example embodiments, the application 622 may be arranged to operate with the program data 624 on the operating system 621 such that implementations of various tag refinement techniques may be provided as described herein. This described basic configuration is illustrated in FIG. 6 by those components within dashed line 601.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., is feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to", etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or is "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to refine a plurality of tags, comprising:
receiving, by a tag refinement system, a plurality of tagging actions each of which associates one or more of the plurality of tags with a digital object; and
refining the plurality of tags to reduce redundancy among the plurality of tags by extracting, by the tag refinement system, a first subset of tags from the plurality of tags, wherein the first subset of tags have a higher collective relativity-similarity score comparing to a second subset of tags selected from the plurality of tags, the first subset of tags, different from the second subset of tags, have a same predetermined tag count as the second subset of tags, and the extracted first subset of tags provide a representation of the digital object, wherein the extracting the first subset of tags further comprises generating a relativity-similarity score for a first tag selected from the plurality of tags based on (1) a relativity score associated with the first tag and (2) a similarity score associated with the first tag and a second tag selected from the plurality of tags and having a co-occurrence relationship with the first tag.

2. The method as recited in claim 1, wherein the extracting the first subset of tags comprises:
for the first tag, wherein the relativity score is calculated based on a number of occurrences of the first tag in the plurality of tagging actions.

3. The method as recited in claim 2, wherein the first tag is selected for having the highest relativity score among the plurality of tags.

4. The method as recited in claim 2, wherein the extracting the first subset of tags further comprises:
for the second tag, wherein the similarity score is calculated based on a number of co-occurrence relationships between the first tag and the second tag in the plurality of tagging actions.

5. The method as recited in claim 4, wherein the second tag is selected for having the highest similarity score among respective tags that have co-occurrence relationships with the first tag.

6. The method as recited in claim 4, wherein the extracting the first subset of tags further comprises:
upon a determination that the relativity-similarity score for the first tag is higher than relativity-similarity scores of those of the plurality of tags that do not belong to the first subset of tags, selecting the first tag as one of the first subset of tags.

7. The method as recited in claim 6, wherein the relativity-similarity score is generated by adding the relativity score with a diversity value calculated by multiplying the relativity score with the similarity score.

8. The method as recited in claim 1, wherein the collective relativity-similarity score is generated by adding corresponding relativity-similarity scores of those tags that are in the first subset of tags.

9. A method to refine a plurality of tags, comprising:
receiving, by a tag refinement system, a plurality of tagging actions each of which associates one or more of the plurality of tags with a digital object;
generating, by the tag refinement system, a tag graph having a plurality of nodes linked by a plurality of edges, wherein each of the plurality of nodes is associated with one of the plurality of tags, and each of the plurality of edges is associated with a corresponding co-occurrence relationship existed in the plurality of tagging actions, wherein each of the plurality of nodes is assigned with a relativity score determined based on a number of occurrences of a corresponding tag in the plurality of tagging actions and each of the plurality of edges is assigned with a similarity score determined based on a number of co-occurrence relationships between two corresponding tags; and
refining the plurality of tags to reduce redundancy among the plurality of tags by extracting, by the tag refinement system, a first subset of tags from the plurality of tags by recursively processing the tag graph to select nodes based on their respective relativity-similarity scores, wherein the first subset of tags have a higher collective relativity-similarity score comparing to a second subset of tags that are selected from the plurality of tags, and the extracted first subset of tags provide a representation of the digital object, wherein the extracting the first subset of tags comprises calculating a first relativity-similarity score for a first node selected from the plurality of nodes based on the first node's relativity score and similarity scores of those edges that are connected with the first node.

10. The method as recited in claim 9, wherein the extracting the first subset of tags comprises:
sorting the plurality of nodes in a sorting order based on relativity scores of the plurality of nodes; and
selecting the first node according to the sorting order.

11. The method as recited in claim 10, further comprising:
upon a determination that the first relativity-similarity score is higher than a predetermined threshold, selecting the first node's corresponding tag as one of the first subset of tags.

12. The method as recited in claim 10, further comprising:
selecting a second node by recursively traversing the tag graph via corresponding edges that are collected with the first node; and
calculating a second relativity-similarity score for the second node.

13. The method as recited in claim 12, further comprising:
upon a determination that the second relativity-similarity score is higher than a predetermined threshold, selecting the second node's corresponding tag as one of the first subset of tags.

14. The method as recited in claim 12, further comprising:
selecting a third node by recursively traversing the tag graph via corresponding edges that are connected with the second node; and
calculating a third relativity-similarity score for the third node.

15. The method as recited in claim 12, further comprising:
upon a determination that the second relativity-similarity score is lower than the predetermined threshold, pruning the second node from further recursive traversing.

16. A system configured to refine a plurality of tags, the system comprising a processor and a memory coupled with the processor, wherein the memory is configured to provide the processor with instructions for:
storing a plurality of tagging actions in a tag list, each of the plurality of tagging actions associates one or more of the plurality of tags with a digital object; and
executing a tag refinement system coupled with the tag list to refine the plurality of tags to reduce redundancy among the plurality of tags by extracting a first subset of tags from the plurality of tags, wherein the first subset of tags have a higher collective relativity-similarity score comparing to a second subset of tags selected from the plurality of tags, the first subset of tags, different from the second subset of tags, have a same predetermined tag count as the second subset of tags, and the extracted first subset of tags provide a representation of the digital object, wherein the tag refinement system extracts the first subset of tags by calculating a first relativity-similarity score for a first tag selected from the plurality of tags based on (1) a relativity score associated with the first tag and (2) a similarity score associated with the first tag and a second tag selected from the plurality of tags and having a co-occurrence relationship with the first tag.

17. The system as recited in claim 16, wherein the plurality of tagging actions is received from a remote client communicating with the tag refinement system via a network.

18. The system as recited in claim 16, wherein the tag refinement system extracts the first subset of tags by:
   selecting a first tag from the plurality of tags for having the highest relativity score among the plurality of tags; and
   upon a determination that the first relativity-similarity score is higher than relativity-similarity scores of those of the plurality of tags that do not belong to the first subset of tags, selecting the first tag as one of the first subset of tags.

19. The system as recited in claim 18, wherein the tag refinement system extracts the subset of tags by:
   calculating a second relativity-similarity score for the second tag; and
upon a determination that the second relativity-similarity score is higher than relativity-similarity scores of those of the plurality of tags that do not belong to the first subset of tags, selecting the second tag as one of the first subset of tags.

\* \* \* \* \*